United States Patent [19]

Cheng

[11] Patent Number: 5,956,049
[45] Date of Patent: Sep. 21, 1999

[54] HARDWARE THAT ROTATES AN IMAGE FOR PORTRAIT-ORIENTED DISPLAY

[75] Inventor: Brett Anthony Cheng, Vancouver, Canada

[73] Assignee: Seiko Epson Corporation, Tokyo, Japan

[21] Appl. No.: 09/036,482

[22] Filed: Mar. 6, 1998

Related U.S. Application Data

[63] Continuation of application No. 08/596,953, Feb. 5, 1996, Pat. No. 5,734,875.

[51] Int. Cl.[6] ..................................................... G06F 12/06
[52] U.S. Cl. .......................... 345/517; 345/501; 345/516; 345/437; 345/126; 382/297
[58] Field of Search .................................... 345/436, 437, 345/516, 517, 501–503, 507, 523, 126, 509; 382/296, 297

[56] References Cited

U.S. PATENT DOCUMENTS

| | | | |
|---|---|---|---|
| 4,716,533 | 12/1987 | Ohmori | 345/436 |
| 4,776,026 | 10/1988 | Ueyama | 345/126 |
| 4,931,960 | 6/1990 | Morikawa | 395/110 |
| 4,952,920 | 8/1990 | Hayashi | 345/126 |
| 5,063,526 | 11/1991 | Kagawa et al. | 345/437 |
| 5,133,076 | 7/1992 | Hawkins et al. | 364/701.11 |
| 5,199,101 | 3/1993 | Cusick et al. | 395/115 |
| 5,432,720 | 7/1995 | Lucente et al. | 364/708.1 |
| 5,450,542 | 9/1995 | Lehman et al. | 345/512 |
| 5,606,348 | 2/1997 | Chin | 345/507 |
| 5,734,875 | 3/1998 | Cheng | 345/516 |

FOREIGN PATENT DOCUMENTS

| | | | |
|---|---|---|---|
| 0 582 824 | 2/1994 | European Pat. Off. | G06F 15/62 |
| WO 91/00586 | 1/1991 | WIPO | G09G 1/06 |

*Primary Examiner*—Kee M. Tung
*Attorney, Agent, or Firm*—Eric B. Janofsky

[57] ABSTRACT

A system for translating a portrait-oriented software address to a portrait-oriented yet landscape-configured display address. The system includes a central processing unit (CPU), a display device and an address translation system. The CPU generates a software address. Based on the orientation of the display device, the address translation system either passes the software address "as is" or translates the address to represent a portrait-oriented display address. The address translation system translates according to the functions L=in $(H_D)$/in 2 and M=in $(W_D)$/in 2, wherein $H_D$ is the landscape-oriented display device pixel height and $W_D$ is the landscape-oriented display device pixel width. L represents the number of least significant software address bits to translate as most significant physical address bits, and M represents the number of most significant software address bits to invert and translate as least significant physical address bits. The resulting address represents a pixel location on the display device which has been rotated counter-clockwise ninety degrees for portrait orientation.

1 Claim, 12 Drawing Sheets

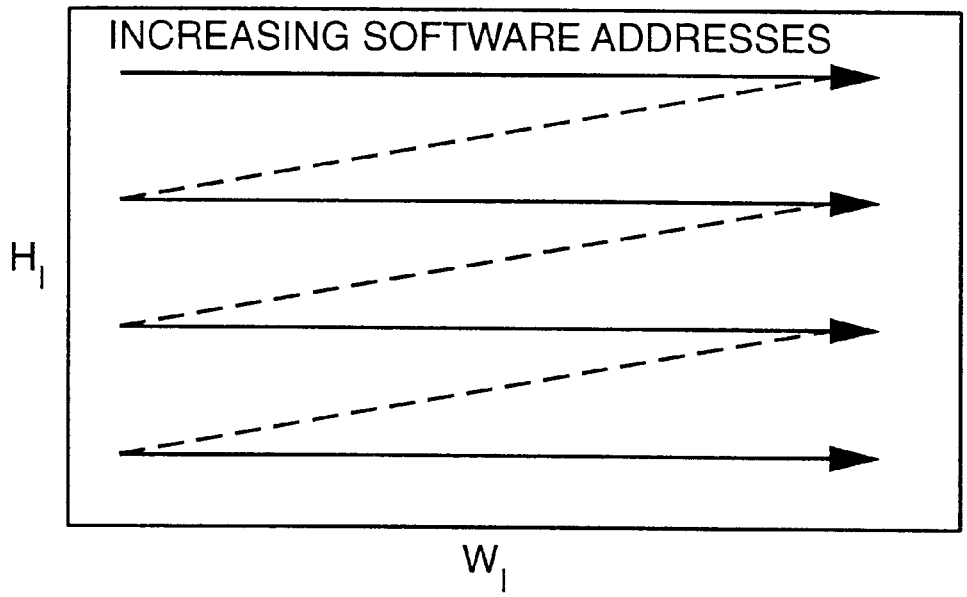
FIG._1a
(PRIOR ART)
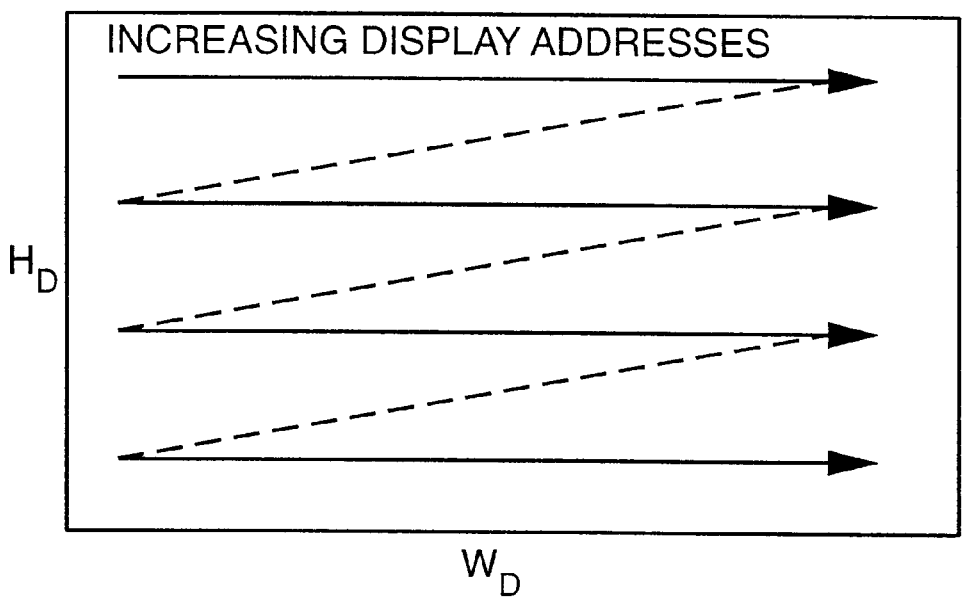
FIG._1b
(PRIOR ART)

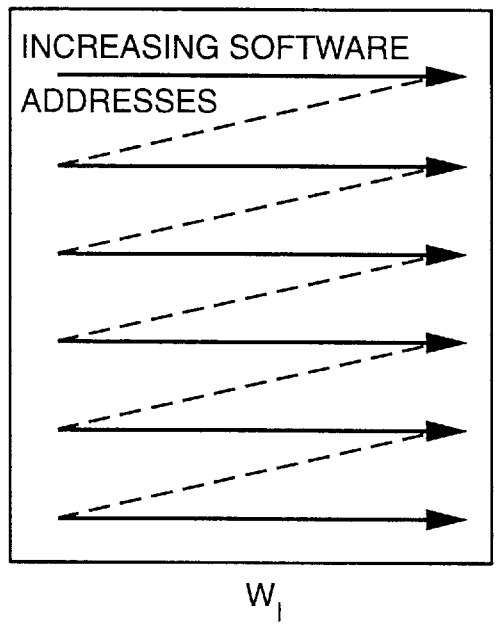
FIG._2a
(PRIOR ART)
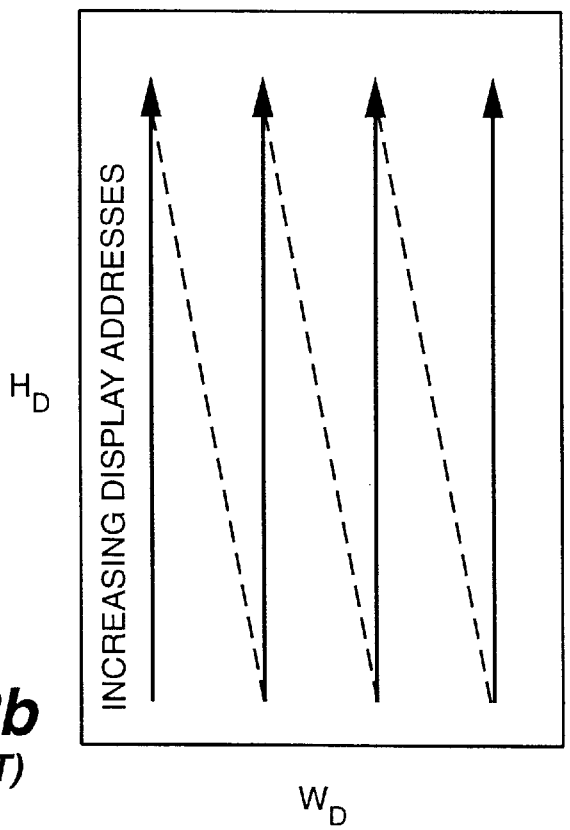
FIG._2b
(PRIOR ART)

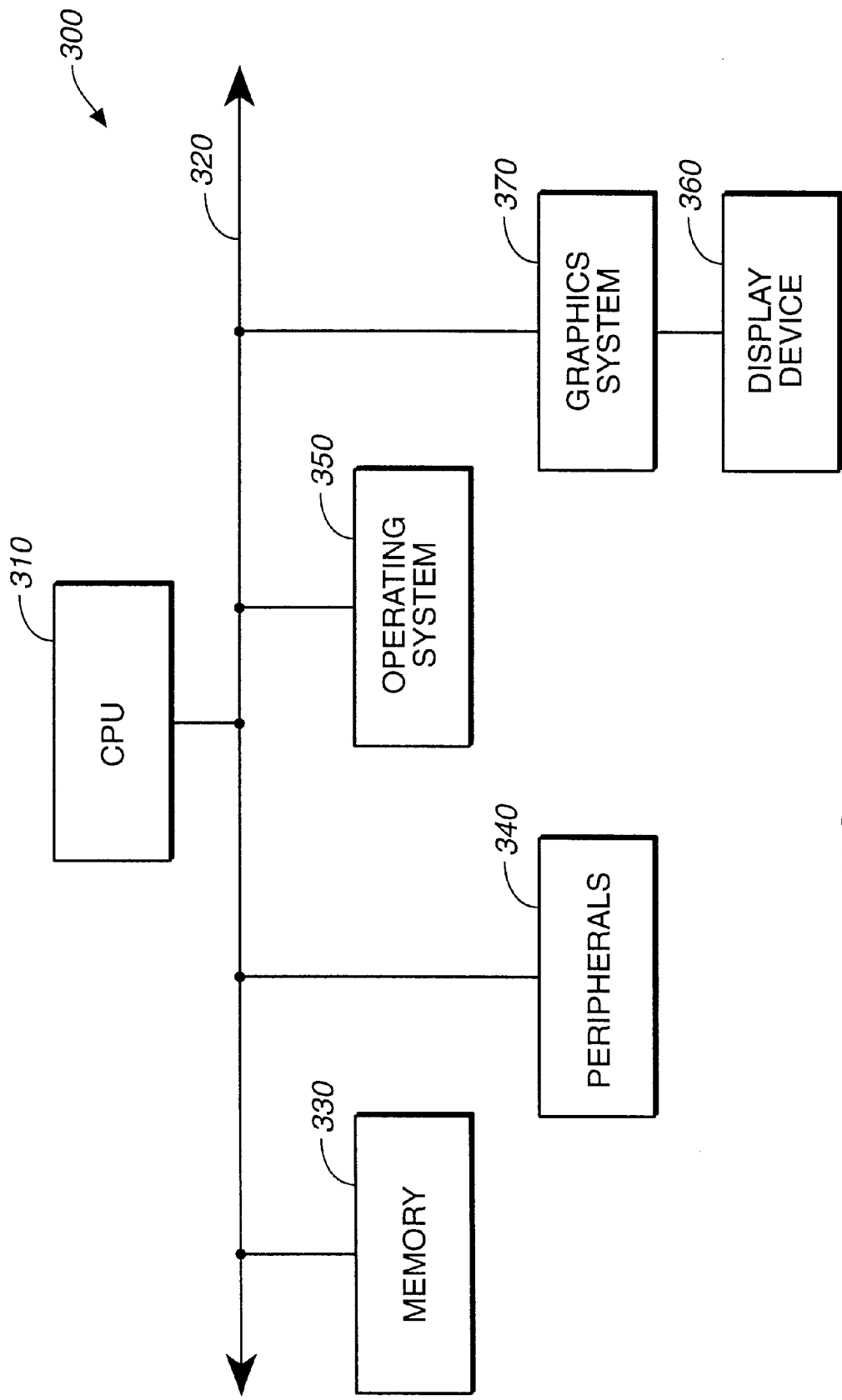
FIG._3

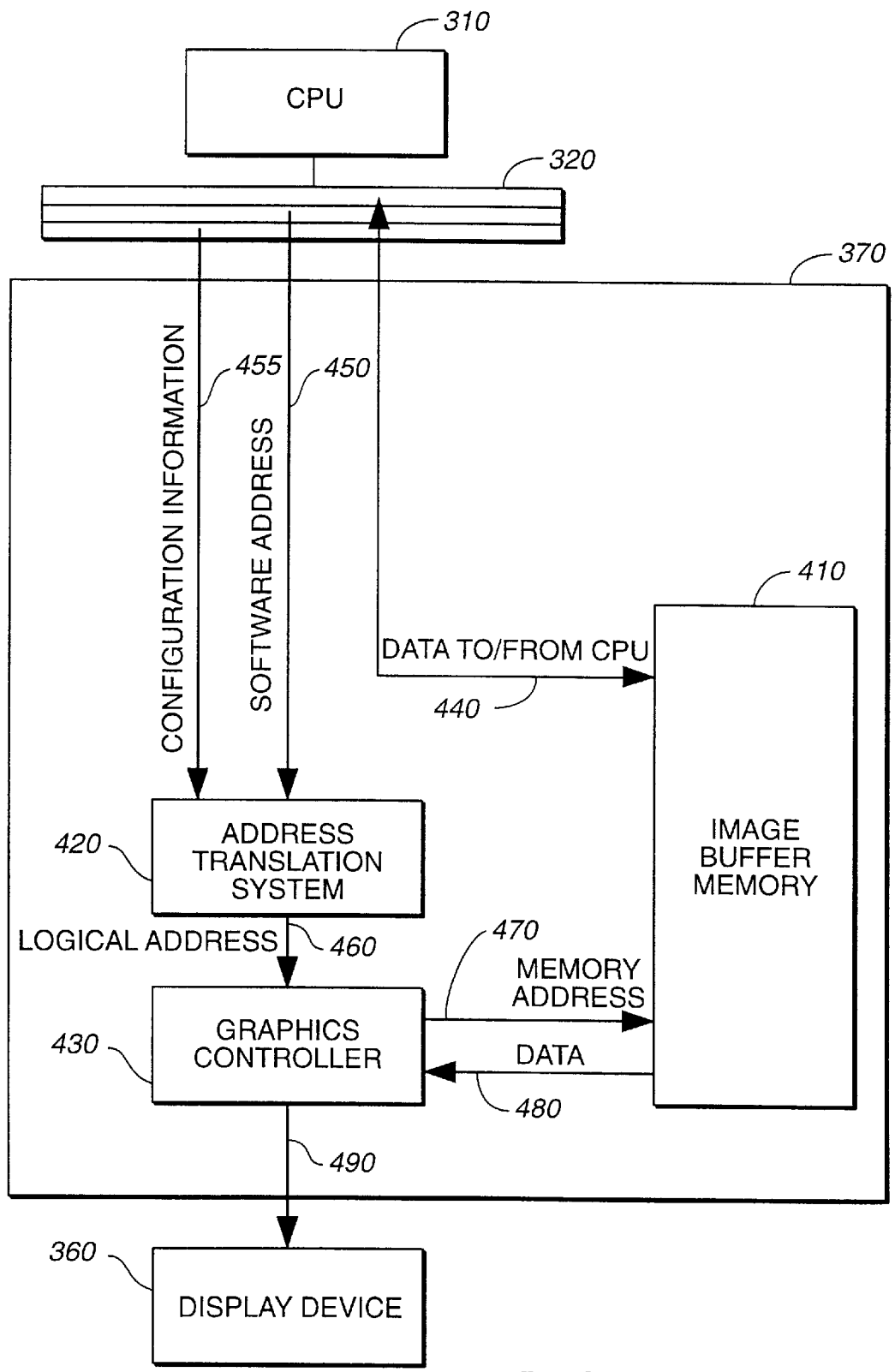
FIG._4

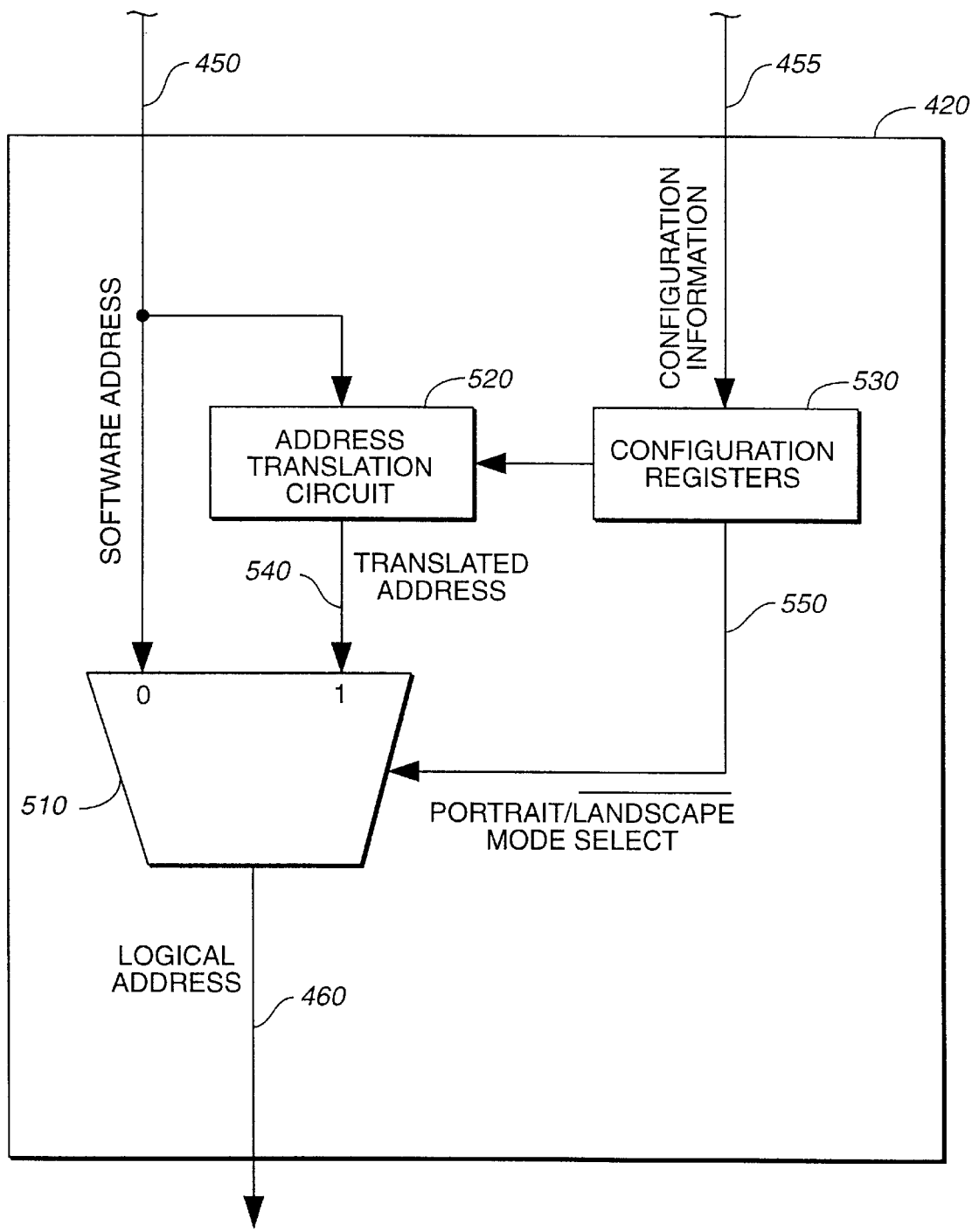
FIG._5

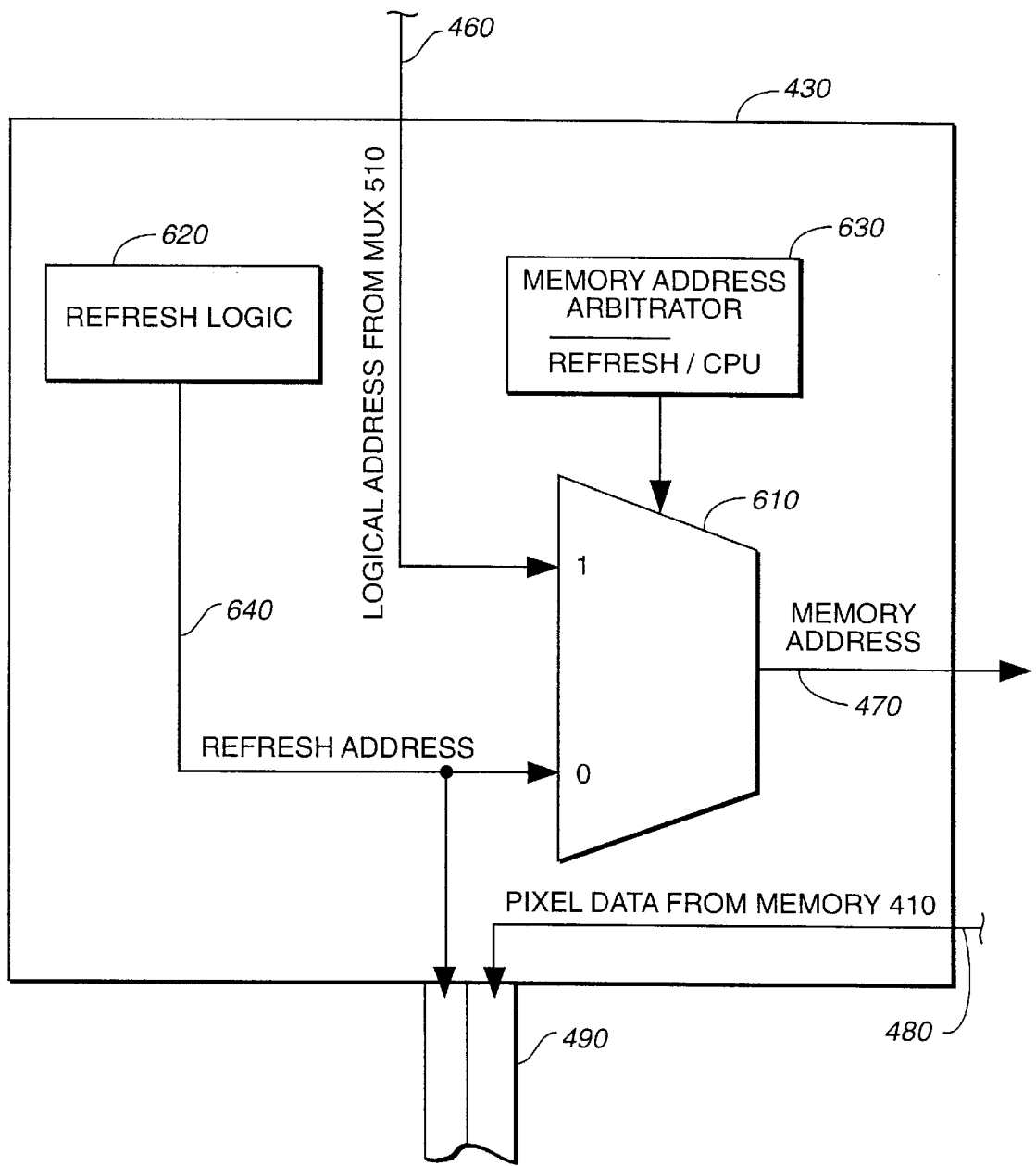
FIG._6

| 00111 | 01111 | 10111 | 11111 |
| 00110 | 01110 | 10110 | 11110 |
| 00101 | 01101 | 10101 | 11101 |
| 00100 | 01100 | 10100 | 11100 |
| 00011 | 01011 | 10011 | 11011 |
| 00010 | 01010 | 10010 | 11010 |
| 00001 | 01001 | 10001 | 11001 |
| 00000 | 01000 | 10000 | 11000 |

FIG._7c

| 0 | 1 | 2 | 3 |
|---|---|---|---|
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |
| 24 | 25 | 26 | 27 |
| 28 | 29 | 30 | 31 |

FIG._7d

| LOGICAL ADDRESS | PHYSICAL ADDRESS | LOGICAL ADDRESS | PHYSICAL ADDRESS |
|---|---|---|---|
| 0 | 0 0 1 1 1 | 16 | 0 0 0 1 1 |
| 1 | 0 1 1 1 1 | 17 | 0 1 0 1 1 |
| 2 | 1 0 1 1 1 | 18 | 1 0 0 1 1 |
| 3 | 1 1 1 1 1 | 19 | 1 1 0 1 1 |
| 4 | 0 0 1 1 0 | 20 | 0 0 0 1 0 |
| 5 | 0 1 1 1 0 | 21 | 0 1 0 1 0 |
| 6 | 1 0 1 1 0 | 22 | 1 0 0 1 0 |
| 7 | 1 1 1 1 0 | 23 | 1 1 0 1 0 |
| 8 | 0 0 1 0 1 | 24 | 0 0 0 0 1 |
| 9 | 0 1 1 0 1 | 25 | 0 1 0 0 1 |
| 10 | 1 0 1 0 1 | 26 | 1 0 0 0 1 |
| 11 | 1 1 1 0 1 | 27 | 1 1 0 0 1 |
| 12 | 0 0 1 0 0 | 28 | 0 0 0 0 0 |
| 13 | 0 1 1 0 0 | 29 | 0 1 0 0 0 |
| 14 | 1 0 1 0 0 | 30 | 1 0 0 0 0 |
| 15 | 1 1 1 0 0 | 31 | 1 1 0 0 0 |
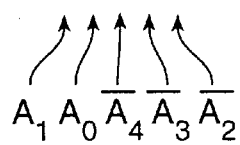 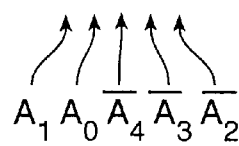
$A_1\ A_0\ \overline{A_4}\ \overline{A_3}\ \overline{A_2}$      $A_1\ A_0\ \overline{A_4}\ \overline{A_3}\ \overline{A_2}$
*FIG._7e*

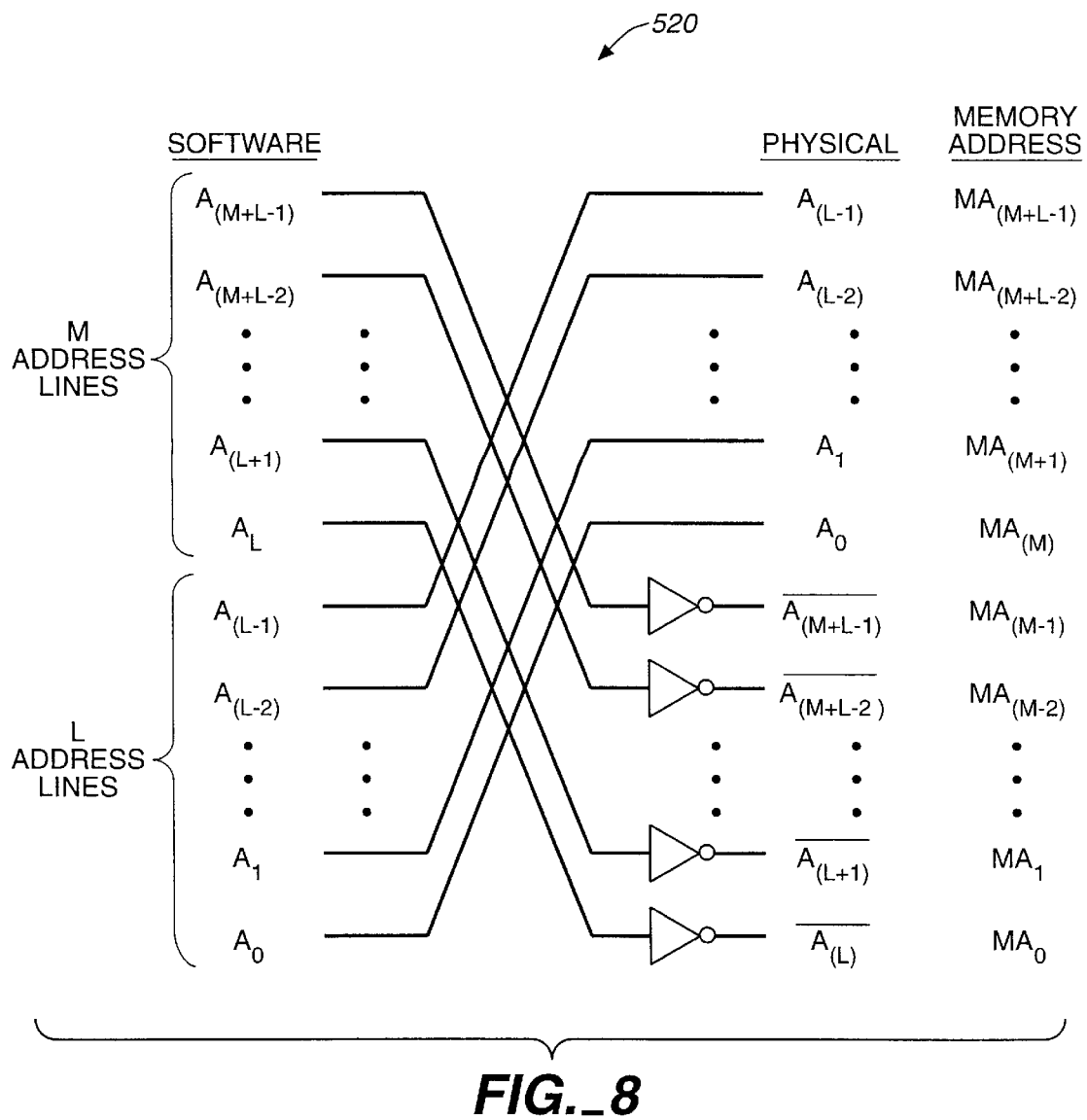
FIG._8

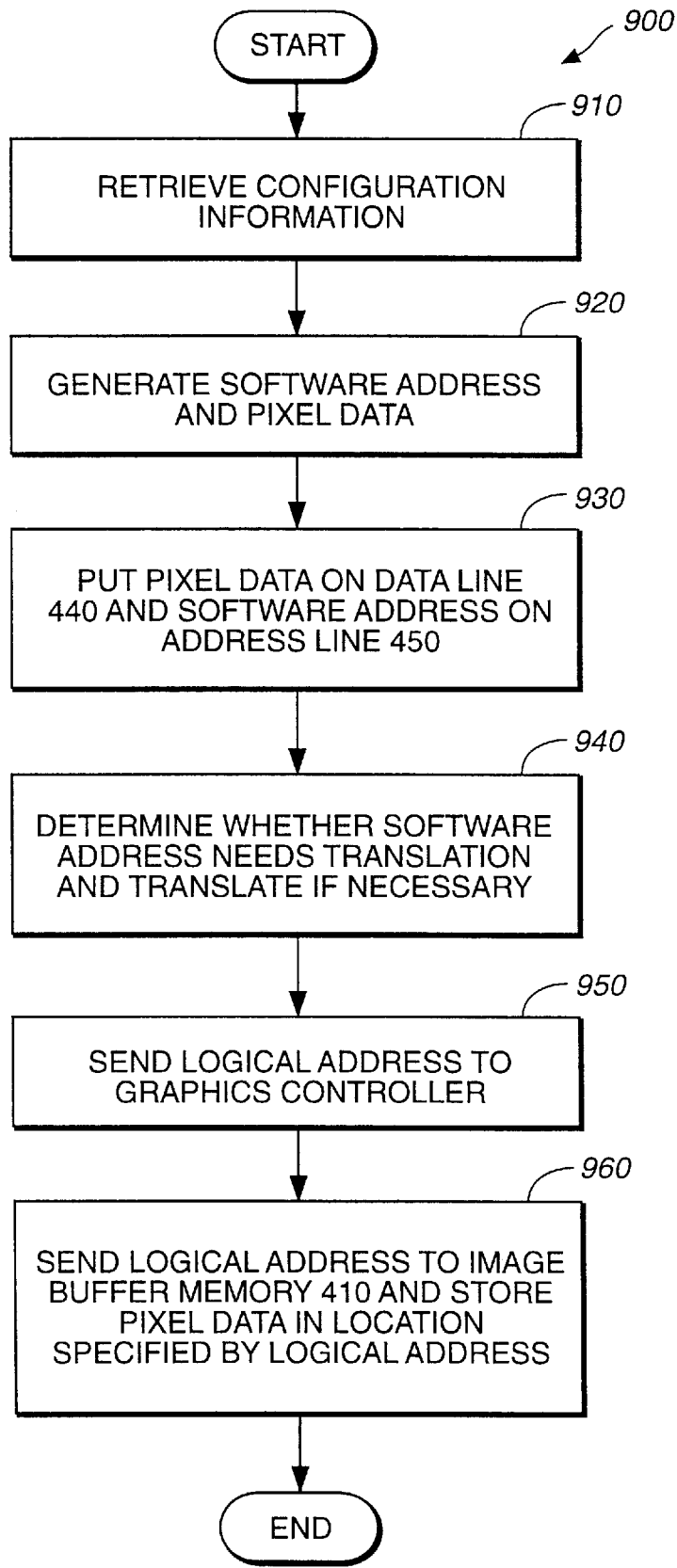
FIG._9

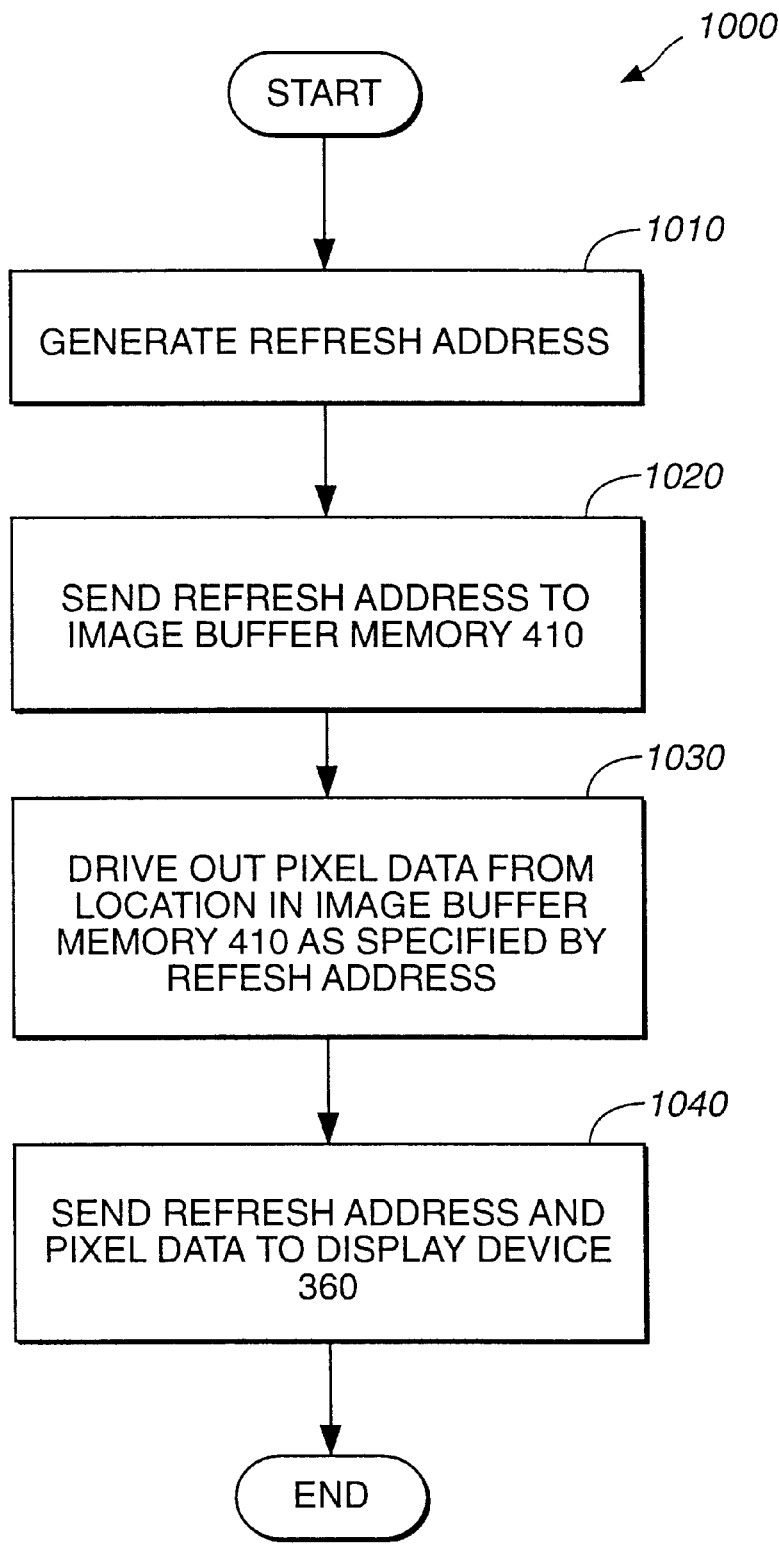
FIG._10

HARDWARE THAT ROTATES AN IMAGE FOR PORTRAIT-ORIENTED DISPLAY

This is a Continuation of prior application Ser. No. 08/596,953 filed on Feb. 5, 1996 which is now U.S. Pat No. 5,734,875 the contents of which are incorporated herein by reference.

BACKGROUND OF THE INVENTION

1. Field of the Invention

This invention relates generally to image processing, and more particularly to a hardware system and method for rotating an image for portrait-oriented display.

2. Description of the Background Art

Computer systems store images in a bitmap format. Bitmaps are organized so that a display controller can read a sequence of bits corresponding to a picture element (pixel) and transfer the sequence to a display for pixel rendition. The display controller repeats this process for successive pixels until an entire image is displayed.

Organization of a bitmap defines image dimensions and image orientation, i.e. portrait or landscape. An image is portrait-oriented if its height is greater than its width, and landscape-oriented if its width is greater than its height. FIG. 1($a$) depicts a landscape-oriented image bitmap. The width ($W_I$) of the image is greater than its height ($H_I$). FIG. 2($a$) depicts a portrait-oriented image bitmap. $H_I$ is greater than $W_I$. The arrows in both corresponding FIGS. 1($a$) and 2($a$) illustrate software addressing patterns in which pixels are typically stored to bitmap storage.

To maximize the duty cycle of the display, i.e. to minimize the period of time between successive refresh cycles of a given scan line, display devices such as Cathode Ray Tubes (CRTs) or Liquid Crystal Displays (LCDs) are typically landscape-configured. That is, display devices have physical address schemes which cause pixels to be refreshed in a landscape-oriented pattern. As can be seen by the arrows in FIG. 1($b$), the typical landscape-oriented display is refreshed starting at the top left corner, and continuing rightward across the first row and downward through the rows.

For some computer systems or applications, it is desirable to have a portrait-oriented display. In such a system, the CRT or LCD would be physically rotated ninety degrees. The arrows in FIG. 2($b$) illustrate that, for the physically rotated display, the refresh address scheme is still landscape-oriented beginning at the original pixel location (rotated ninety degrees counter-clockwise to the bottom left corner now) and continuing in the same order.

The software addressing pattern depicted in FIG. 1 ($a$) is the same as the physical address pattern depicted in FIG. 1($b$), so landscape-oriented software addresses to landscape-oriented physical addresses do not need to be translated. However, the software addressing pattern depicted in FIG. 2($a$) is not the same as the physical address pattern depicted in FIG. 2($b$). Thus, portrait-oriented image addresses need translation to a physical address for a portrait-oriented landscape-configured display.

The prior art rotates an image ninety degrees using a program or a special driver to translate software addresses to physical addresses. When the typical rotation program is instructed to draw a bitmap sequence, the program first performs software translation operations to determine new pixel coordinates when rotated 90°, and then performs the drawing operation using those translated coordinates. In some particular drawing operations, additional software may be necessary to treat the rotated drawing as a "special case." For example, to draw text characters in a rotated graphics display would require retrieving the bitmapped font pixels from font storage in a rotated orientation rather than the normal byte-wise unrotated orientation in which the font data is stored. This may require several additional memory cycles to retrieve this rotated bitmapped font data for just a single line of a given character. In general, the large number of additional read and translation operations for any drawing operation to rotate an image consumes substantial computer processing resources and time. These problems are compounded when rotating larger or more complex images. Therefore, a system is needed to rotate an image for portrait-oriented display without using inefficient software programming or impeding refresh operations.

SUMMARY OF THE INVENTION

The present invention overcomes limitations and deficiencies of previous systems by providing a system and method for translating a portrait-oriented software address to a physical address for a portrait-oriented landscape-configured display device. The system includes a central processing unit (CPU), coupled to a processor bus, for executing program instructions and memory management routines. The system also includes memory, peripherals, an operating system, and a graphics system coupled to the processor bus, and a display device coupled to the graphics system.

The display device is landscape-configured and thus refreshed in a landscape pattern regardless of the physical orientation of the display. The graphics system controls display refreshing and image rendering, and includes an image buffer memory, an address translation system and a graphics controller. The address translation system receives a software address and corresponding pixel information from the CPU, and based on the orientation of the display device, passes the pixel information to an image buffer memory location specified by either the address "as is" or the address as translated to specify the physical address portrait-oriented location. Alternatively, the CPU can perform a read operation, and thus passes no data. The image buffer memory stores the translated bitmap matrix defining the display image. The graphics controller then passes the pixel information defined by the translated bitmap stored in the image buffer memory to the display device.

The address translation system includes a multiplexer, an address translation circuit and configuration registers. The configuration registers store a signal indicating the physical orientation of the display device as landscape or portrait. The address translation circuit is designed according to the functions L=in($H_D$)/in 2 and M=in($W_D$)/in 2, wherein $H_D$ is the height in pixels of the display device and $W_D$ is the width in pixels of the device display. L represents the number of least significant software address bits to translate as most significant physical address bits and M represents the number of most significant software address bits to translate as inverted least significant physical address bits. The resulting address represents the physical address for an image rotated counter-clockwise ninety degrees on the display device. The multiplexer receives the software address generated by the CPU at a first input and the image address translated by the address translation circuit at the second input. Based on the orientation signal stored in the configuration registers, the multiplexer passes either the software address or the translated address to the image buffer memory.

The graphics controller includes a second multiplexer, refresh logic and a memory address arbitrator. The second multiplexer receives a refresh address from the refresh logic and a logical address from the address translation system. Based on arbitration signals received from the memory address arbitrator, the second multiplexer passes either the refresh or logical address to the display device for pixel generation. Since the invention renders software programs unnecessary for portrait-oriented software to portrait-oriented physical address translations, system performance is improved. Additionally, a system to rotate an image for portrait oriented display eliminates the need to develop special or additional software for the rotated case. With such a system, the same conventional software program or driver can be used for drawing in both portrait and landscape orientation.

The invention also provides methods for performing image rotation. A method includes the steps of retrieving configuration information, generating a software address and possibly corresponding pixel data for performing a write operation and sending the data to the image buffer memory and the address to a translation system. The translation system determines whether the address needs translation and translates the address if necessary. The translation is performed using the functions described above. The address is then sent to the image buffer memory which stores the pixel data at the specified address.

Another method includes the steps of generating a refresh address, sending the refresh address to the image buffer memory, the image buffer memory driving out pixel data stored in the location specified by the refresh address, and sending the refresh address and pixel data to the display for pixel refreshing.

BRIEF DESCRIPTION OF THE DRAWINGS

FIG. 1(a) is a block diagram illustrating a landscape-oriented software addressing pattern;

FIG. 1(b) is a block diagram illustrating a landscape-oriented and landscape-configured display address scheme;

FIG. 2(a) is a block diagram illustrating a portrait-oriented software addressing pattern;

FIG. 2(b) is a block diagram illustrating a portrait-oriented yet landscape-configured display address scheme;

FIG. 3 is a block diagram of a computer system which rotates an image for portrait-oriented display in accordance with the present invention;

FIG. 4 is a block diagram of the graphics system of FIG. 3;

FIG. 5 is a block diagram of the translation system of FIG. 4;

FIG. 6 is a block diagram of the graphics controller of FIG. 4;

FIG. 7(a) is a table illustrating a landscape-oriented four by eight software address matrix;

FIG. 7(b) is a table illustrating the physical address matrix when the display device is rotated counter-clockwise ninety degrees;

FIG. 7(c) is a table illustrating the binary equivalent of the FIG. 7(b) table;

FIG. 7(d) is a table illustrating a portrait-oriented software addressing matrix;

FIG. 7(e) is a table for comparing the physical binary addresses of FIG. 7(c) with the portrait-oriented software address matrix of FIG. 7(d);

FIG. 8 is a schematic diagram of a general case address translation circuit of FIG. 5;

FIG. 9 is a flowchart illustrating a preferred method for mapping a software address to a physical display device address; and FIG. 10 is a flowchart illustrating a preferred method for refreshing a pixel on the display device.

DETAILED DESCRIPTION OF THE PREFERRED EMBODIMENT

FIG. 3 is a block diagram of a computer system 300 for rotating a portrait-oriented software matrix to produce a portrait-oriented display matrix in accordance with the present invention. System 300 includes a Central Processing Unit (CPU) 310, coupled to a processor bus 320, for executing program instructions and memory management routines such as address generation. System 300 also includes a memory 330, peripherals 340, an operating system 350, a graphics system 370 coupled to processor bus 320, and a display device 360 coupled to graphics system 370.

Memory 330 comprises Random Access Memory (RAM), Read-Only Memory (ROM) or secondary disk memory, and typically stores miscellaneous data, programs for execution by CPU 310, and intermediate results of executing programs. Peripherals 340 may include a printer, a floppy disk drive, a keyboard and the like. Operating system 350 is a program stored in memory that controls and facilitates processing carried out by CPU 310. Display device 360, for example a CRT or an LCD, is typically landscape-configured and displays computer-generated information to a user. A landscape-configured display device is refreshed in a landscape pattern as in FIGS. 1(b) and 2(b).

Graphics system 370 controls screen refreshing and image rendering routines for display device 360. When instructed, graphics system 370 translates portrait-oriented software addresses to physical addresses for portrait-oriented yet landscape-configured display device 360.

A software address specifies a location on an image intended for display on display device 360, and can be generated by any software application program such as Microsoft Word by Microsoft Corporation or SuperPaint by Aldus Corporation. The software address scheme depends on the orientation of display device 360. That is, if display device 360 is intended for use in landscape orientation, the software address scheme follows the pattern as illustrated in FIG. 7(a). If display device 360 is intended for use in portrait orientation, the software address scheme follows the pattern illustrated in FIG. 7(d). The physical address specifies a pixel location on display device 360. The physical address scheme is constant regardless of the orientation of display device 360, as illustrated in FIGS. 7(a) and 7(b). Because the physical address scheme for the rotated case as illustrated in FIG. 7(b) is not the same as the software address scheme as illustrated in FIG. 7(d), address mapping between software and physical addresses for the rotated case is necessary. The relationships between FIGS. 7(a), 7(b) and 7(d) are discussed in more detail below.

FIG. 4 is a block diagram of graphics system 370, which includes an image buffer memory 410, an address translation system 420 and a graphics controller 430.

Image buffer memory 410 stores a bitmap matrix which defines an image to be presented on display device 360. The bitmap matrix includes sequences of bits, each sequence of which defines pixel information including pixel position, color, resolution, contrast, etc. Based on the organization of the bitmap matrix, an image can be arranged for landscape or portrait-oriented display.

Image buffer memory 410 receives pixel information data on a data line 440 of bus 320 from CPU 310 and a memory address on an address line 470 from graphics controller 430. The received memory address specifies the location in image buffer memory 410 to which the data on line 440 is written or the data on line 440 is to be read. Image buffer memory 410 is preferably a static RAM (SRAM) device, since an SRAM is accessed by a unified address and therefore avoids potential page-break inefficiencies as found when using a fast-page (FP) Dynamic RAM (DRAM). However, as long as the DRAM page breaks are managed, an FP-type or other similar type DRAM can alternatively be used.

Address translation system 420 receives an address (generated by the software application program) on an address line 450 of bus 320 from CPU 310 for performing a read or write operation. When performing a write operation, based on the orientation of display device 360, address translation system 420 either passes the received address "as is" to correspond to a landscape-oriented display device 360, or passes the address as translated to correspond to a pixel position on a portrait-oriented display device 360. The address is sent on line 460 to graphics controller 430. This address is referred to as a "logical" address, and specifies an image buffer memory 410 location for storing the pixel data being driven on data line 440.

Graphics controller 430 controls image buffer memory 410 and display device 360. More particularly, graphics controller 430 receives the logical address on line 460 from address translation system 420 and sends the logical address on line 470 to image buffer memory 410. Upon receipt of the address for a write operation, image buffer memory 410 stores the data being sent on line 440 from CPU 310 to the location specified by the received logical address. Upon receipt of the address for a read operation, image buffer memory 410 drives data out on line 440 to CPU 310.

Since the address translation is performed before the image information or data is stored in image buffer memory 410, the image buffer memory 410 bitmap matrix defines the orientation of the image as it will be displayed on display device 360. If the data were stored to image buffer memory 410 without translation, landscape-oriented display device 360 will display a landscape-oriented image. However, if the data were stored to image buffer memory 410 using a translated address, portrait-oriented yet landscape-configured display device 360 will display a portrait-oriented image.

Graphics controller 430 also performs display device 360 refresh address generation, which may be implemented conventionally. Graphics controller 430 sends the refresh address on line 470 to image buffer memory 410 to retrieve the corresponding pixel information on line 480, and passes the refresh address and pixel information on a signal bus 490 to display device 360. Accordingly, display device 360 refreshes the pixel.

FIG. 5 is a block diagram of address translation system 420, which includes a multiplexer 510, an address translation circuit 520 and configuration registers 530.

Configuration registers 530 store display device 360 configuration information such as screen dimensions and the display orientation. The screen dimensions specify the display width ($W_D$) and the display height ($H_D$), both in pixels. The display orientation specifies whether display device 360 is positioned in landscape orientation as illustrated by FIG. 1(b) or in portrait orientation as illustrated in FIG. 2(b). CPU 310 retrieves the configuration information including the display orientation from Dual In-line Package (DIP) switches set by Original Equipment Manufacturers (OEMs), toggle switches or other means, and stores the information in configuration registers 530. Alternatively, CPU 310 may reverse the order of the dimensions to store 240 pixels per row by 320 pixels per column. Display device 360 is still landscape-configured but the display orientation signal can be determined from the order of the dimensions as stored.

For example, display device 360 may be configured to present 320 pixels per row by 240 pixels per column, and intended to be positioned in portrait orientation. This information may be stored in conventional DIP switches on display device 360. Thus, CPU 310 retrieves the information from the DIP switches and stores the dimensions indicating 320 pixels per row by 240 pixels per column, and a signal indicating portrait orientation, in configuration registers 530.

Address translation circuit 520 converts a portrait-oriented software address to a physical address for a portrait-oriented yet landscape-configured display device 360. That is, address translation circuit 520 receives a software address on line 450 from CPU 310 and reorders the address bits to specify a new pixel address for a pixel location on portrait-oriented display device 360 when rotated counter-clockwise ninety degrees. Although display device 360 can be rotated clockwise ninety degrees, counter-clockwise rotation provides an easier general case translation function.

The translation from portrait-oriented software address space to portrait-oriented, yet landscape-configured, display device 360 address space is based on the function:

$$2^L = H_D; \text{ or}$$

$$L = \ln(H_D)/\ln 2,$$

wherein $H_D$ is the height in pixels of landscape-oriented display device 360 as illustrated in FIG. 1(b). L represents the number of least significant software address bits to re-order as most significant physical address bits. The translation is based also on the function:

$$2^M = W_D; \text{ or}$$

$$M = \ln(W_D)/\ln 2$$

wherein $W_D$ is the width in pixels of landscape-oriented display device 360. M represents the number of most significant software address bits to re-order and invert (complement) as least significant physical address bits. M+L is the total number of address bits specifying both the software and physical addresses.

Address translation circuit 520 passes the new translated address on line 540 to one input of MUX 510, and the software address on line 450 from CPU 310 is received at the second input of MUX 510. Based on the control signal received on line 550 specifying the orientation of display device 360 from configuration registers 530, multiplexer 510 selects one of its two input addresses and passes it as a logical address on address line 460 to graphics controller 430 (FIG. 4).

FIG. 6 is a block diagram of graphics controller 430, which includes a MUX 610, refresh logic 620, and a memory address arbitrator 630. MUX 610 receives refresh address signals on line 640 from refresh logic 620, and logical addresses on line 460 from translation system 420. Refresh logic 620 may generate refresh addresses corresponding to pixel locations on display device 360 using conventional refresh address generation techniques.

Based on a control signal received from memory address arbitrator 630, MUX 610 selects either the refresh signal from line 640 or the logical address from line 460 and transfers it on line 470 to image buffer memory 410. Arbitrator 630 uses priority and time management schemes to determine which control signal to send. For example, arbitrator 630 may give priority to refresh addresses and enable pipelined refresh addresses for multiple pixel refreshes. When a logical address is selected and sent as the memory address on line 470 to image buffer memory 410 (FIG. 4), the data on line 440 from CPU 310 is written to the image buffer memory 410 location specified by the logical address. When a refresh address is selected and sent as the memory address on line 470 to image buffer memory 410, image buffer memory 410 delivers the corresponding pixel information or data on line 480 to graphics controller 430, which forwards the refresh address and pixel information on line 490 to display device 360.

Thus, CPU 310 writes pixel information or data to and reads information from image buffer memory 410 in the same manner regardless of the orientation of display device 360. No software translation program is needed.

FIGS. 7(*a*)–7(*e*) illustrate the portrait-oriented software address to portrait-oriented physical address translation function. More particularly, FIG. 7(*a*) is a table that illustrates a landscape-oriented four by eight address matrix representing software addresses for a landscape-oriented image and also representing physical addresses for landscape-oriented display device 360. The landscape-oriented software and physical address scheme preferably starts in the top left corner at address "0" and continues across the first row of eight addresses and scans successive rows downward through the four rows. Since the software addresses are the same as the physical addresses, no software to physical address translation is needed.

However, if display device 360 is rotated ninety degrees counter-clockwise and the appropriate configuration information is stored in configuration registers 530 (FIG. 5), then the physical address matrix for display device appears as illustrated in FIG. 7(*b*). The physical address matrix for rotated display device 360 in FIG. 7(*b*) now starts in the bottom left corner at address "0" and continues upward through the first column of eight addresses and scans successive columns rightward through the four columns. FIG. 7(*c*) is a table illustrating the binary equivalent of the numbers in the table of FIG. 7(*b*). Since there are thirty-two addresses in FIG. 7(*a*), each address is defined by five binary bits in FIG. 7(*c*).

Since physical display device 360 has been rotated ninety degrees counter-clockwise, CPU 310 uses a new software address matrix which specifies a portrait-oriented address scheme as illustrated in FIG. 7(*d*). Thus, the new software address scheme starts at the top left corner at address "0" and continues across the first row of four column addresses and scans successive rows downward through the eight rows. However, the new software address matrix illustrated in FIG. 7(*d*) is not the same as the physical address matrix illustrated in FIG. 7(*b*), and thus a translation is needed.

FIG. 7(*e*) is a table for comparing the portrait-oriented software address matrix of FIG. 7(*d*) with the physical binary addresses of FIG. 7(*c*). Applying the above-described FIG. 5 address translation functions to the FIGS. 7(*a*)–7(*e*) example gives L=in 4/in 2=2, and M=in8/in 2=3. Thus, the invention transposes the two least significant bits A1 and A0 in the software address to the two most significant bits in the physical address. The invention also inverts the three most significant software address bits A4, A3 and A2 and transposes then to the three least significant physical address bits. The translation function re-orders the software address as A1, A0, $\overline{A4}$, $\overline{A3}$, $\overline{A2}$ to generate the logical, and thus physical, address.

When a dimension of display device 360 is not on the order of $2^N$ n pixels, then, since display device 360 would not have corresponding locations for all memory spaces addressable by M+L address lines, system 300 implements offsets. To ensure that all logical addresses generated can be mapped to locations on display device 360, offsets may be handled by software or drivers in a conventional manner. These offsets may be stored in configuration registers 530 (FIG. 5), in DIP switches set by OEMs, or elsewhere.

For example, a typical landscape-oriented display device is configured to render 320 pixels per row by 240 pixels per column. Neither 320 nor 240 equals two raised to an integer power. Offsets are therefore needed. First, address translation circuit 520 is designed based on the closest larger address space using dimensions on the order of two raised to an integer power, namely, 512 by 256. Offsets are determined based on this next-larger address space. That is, the 192 rightmost landscape-oriented columns and the 16 bottommost landscape-oriented rows of the available memory space cannot be mapped to locations on display device 360. These offsets are stored and used to prohibit mapping logical addresses to these areas. When display device 360 is rotated 90 degrees counter-clockwise to portrait orientation, the now topmost 192 rows and rightmost 16 columns of available memory space are not mappable.

To avoid offset calculations, display device 360 may be designed to have pixel dimensions equal to two raised to an integer power.

FIG. 8 illustrates a translation circuit 520 designed for a general case address matrix. According to the translation functions described with reference to FIG. 5, L is the number of least significant software address bits to re-order as most significant physical address bits, M is the number of most significant software address bits to invert and re-order as least significant physical address bits, and M+L is the total number of address bits specifying the software or physical address. Therefore, the most significant software addresses $A_{(M+L-1)}$ to $A_{(L)}$ are complemented and mapped to memory address locations $MA_{(M-1)}$ to $MA_0$. The least significant software addresses $A_{(L-1)}$ to $A_0$ are mapped to the memory address locations $MA_{(M+L-1)}$ to $MA_{(M)}$. Further, FIG. 8 illustrates the function for the physical address based on the software address, namely, $A_{(L-1)}$ . . . $A_0$ followed by $\overline{A}_{(M+L-1)}$ . . . $\overline{A}_{(L)}$.

FIG. 9 is a flowchart illustrating a preferred method 900 for mapping a software address to a physical display device 360 address. Method 900 begins in step 910 by CPU 310 retrieving configuration information on display device 360 including display device 360 dimensions and orientation. In step 920, the software application program generates a software address based on pixel data and the retrieved configuration information. If the configuration information specifies a landscape-oriented display device 360, the software application program uses a landscape-oriented software address scheme as illustrated in FIG. 7(*a*). If the configuration information specifies a portrait-oriented display device 360, the software application program uses a portrait-oriented software address scheme as illustrated in FIG. 7(*d*).

In step 930, CPU 310 puts the pixel data on data bus 440 and the software address on address bus 450. The software address is received by address translation system 420, which in step 940 determines whether address translation is necessary. If the configuration information indicates that display device 360 is landscape oriented, no address translation is needed. Otherwise, address translation is needed, in which case the address is translated according to the function described above with reference to FIG. 5. Address translation system 420 generates a logical address, which is either the software address "as is" or else the address translated to specify a pixel location if the display has been rotated counter-clockwise ninety degrees.

In step 940, the logical address is sent on line 460 to graphics controller 430, which in step 950 passes the logical address as a memory address on line 470 to image buffer memory 410. Upon receipt of the memory address, in step 960 image buffer memory 410 stores the pixel data on data line 440 at the specified memory location. Method 900 then ends.

FIG. 10 is a flowchart illustrating a preferred method 1000 for refreshing pixels on display device 360. Method 1000 starts in step 1010 with graphics controller 430 conventionally generating a refresh address. In step 1020 MUX 610 selects the refresh address and passes it as the memory address on line 470 to image buffer memory 410. Upon receipt of the memory address in step 1030, image buffer memory 410 drives out the pixel data on line 480 from the specified location in image buffer memory 410 to graphics controller 430. In step 1040, graphics controller 430 sends the refresh address and the retrieved pixel data via bus 490 to display device 360, which refreshes the location. Method 1000 then ends.

System 300 advantageously translates portrait-oriented software addresses to physical addresses for a portrait-oriented yet landscape-configured display device 360. First, since translations are performed in hardware, inefficient software translation application is not needed. Second, since the translation is performed before the pixel data is stored into image buffer memory 410, successive translations for refreshes are not necessary. Third, since the translation is performed in hardware CPU 310 can access memory in the same manner regardless of the orientation of display device 360.

The foregoing description of the preferred embodiments of the invention is by way of example only, and variations of system 300 are provided by the present invention. For example, although display device 360 is described as landscape-configured, display device 360 can alternatively be portrait configured and the translation function reversed. Second, although display device 360 is rotated counter-clockwise, display device 360 may be rotated clockwise and a complementary address translation function implemented. Third, system 300 can be embodied in a multiprocessor or multithreaded environment. Fourth, although image buffer memory 410 is illustrated as a separate memory block from memory 330, system 300 can be implemented using a unified memory architecture. Fifth, the invention can be used with scanning output devices other than display devices, such as laser printers.

The embodiments described herein are presented for purposes of illustration and are not intended to be exhaustive or limiting, and many variations and modifications are possible in light of the foregoing teaching. System 300 is limited only by the following claims.

What is claimed is:

1. A method for displaying an image on a display in accordance with image pixel data signals received from a host device, said method comprising the steps of (a) receiving the image pixel data signals representing picture elements successively in columns across rows, and in rows across the display;

(b) receiving image pixel address signals successively identifying the row and column of corresponding pixel data signals;

(c) translating the received image pixel address signals into logical address signals successively identifying the column and row of corresponding pixel data signals representing picture elements successively in rows across columns, and in columns across a screen;

(d) storing the received image pixel data signals in columns and rows identified by corresponding logical address signals; and (e) reading the stored image pixel data in columns and rows identified by corresponding logical address signals;

(f) controlling addressing of step(d) and step(e) by (f1) generating screen refresh address signals, (f2) generating a select signal, (f3) selecting one of said logical address signals from step (c) and said refresh address signals from step (f1) in response to the select signal of step (f2);

wherein in step (f3) the logical address signals are selected when the received image pixel data signals are stored in step (d);

wherein in step (f3) said refresh address signals are selected when the stored image pixel data are read in step (e); and displaying when the stored image pixel data are read in step (e) as controlled by step (f).

* * * * *

UNITED STATES PATENT AND TRADEMARK OFFICE
CERTIFICATE OF CORRECTION

PATENT NO.    : 5,956,049
DATED         : September 21, 1999
INVENTOR(S)   : Brett Cheng It is certified that errors appear in the above identified patent and that said Letters Patent is hereby corrected as shown below:

Title page, item 57, Abstract, change "in" to --ln-- in all four instances.

Signed and Sealed this

Seventeenth Day of October, 2000

Attest:

Q. TODD DICKINSON

Attesting Officer

Director of Patents and Trademarks